3,200,024
METHOD AND APPARATUS FOR MAKING
ROLLED-UP ANNULAR BODIES
Kurt Leibiger, Kreis Harburg, Germany, assignor to
Asbest- und Gummiwerke Martin Merkel K.G., Hamburg-Wilhelmsburg, Germany
Filed Oct. 2, 1962, Ser. No. 227,838
Claims priority, application Germany, Dec. 1, 1961,
A 38,913
14 Claims. (Cl. 156—184)

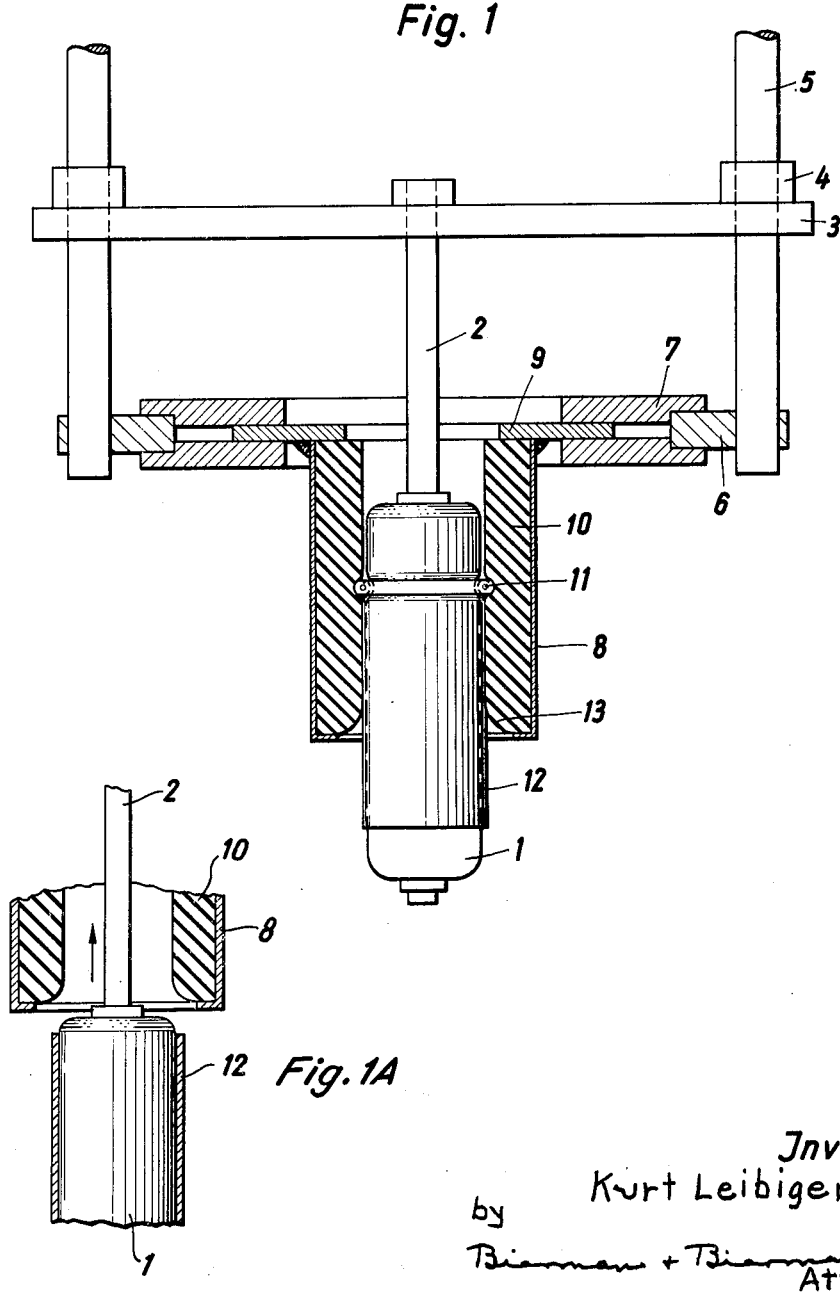

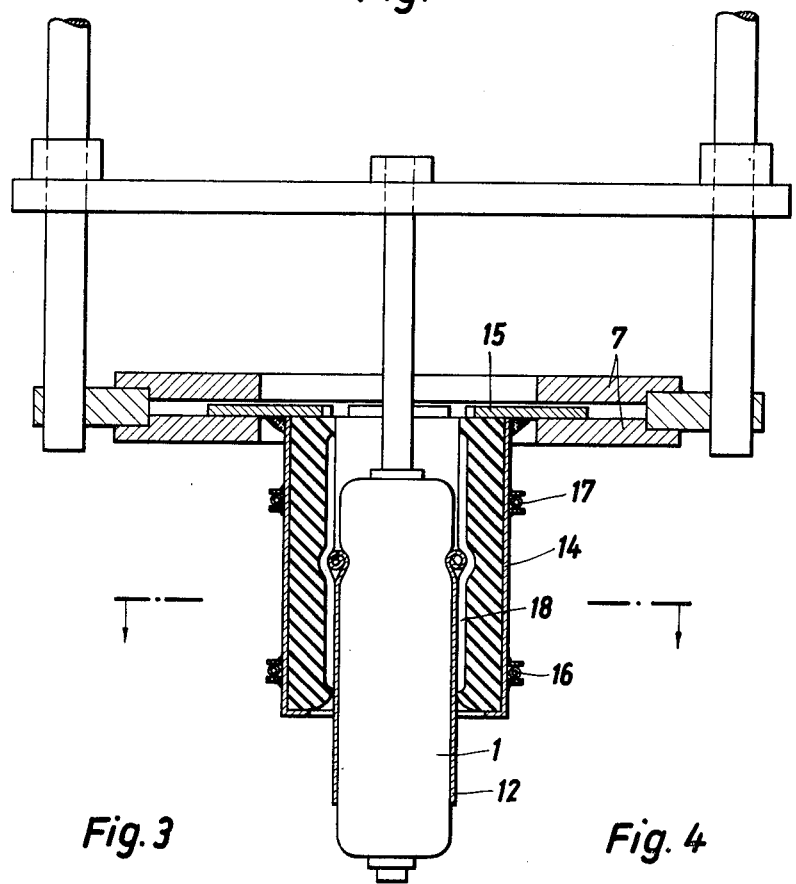
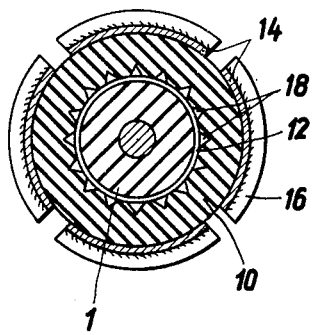
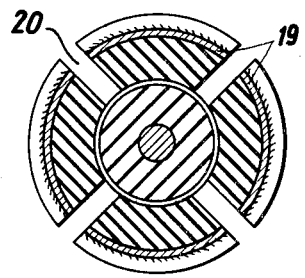

The present invention relates to an improvement on a method of manufacturing rolled annular bodies on an elastic mandrel in accordance with copending application Ser. No. 75,872 filed Dec. 14, 1960, now Patent No. 3,139,366 issued June 30, 1964. In the method in accordance with said application, a device for producing rolled annular bodies of knitted or woven fabrics, preferably impregnated with rubber, synthetic resin or the like, sheets, plates, layers of rubber, paper or metal, which has a mandrel on which there is arranged a roll stocking adapted to be removed from the mandrel by turning it inside out after the application of the material to be rolled, for the rolling of said material, characterized by the fact that the mandrel is elastic.

In the method in accordance with the present invention, the roll stocking, which is subject to relatively heavy wear in operation, can be dispensed with. The method is characterized by the fact that the rolled-roll is rolled over the mandrel by friction by a hollow cylinder surrounding the mandrel and moved axially with respect thereto.

It is advantageous to provide the hollow cylinder on the inside with a covering which increases the friction. In accordance with another feature of the invention, the hollow cylinder used in this method can be elastically resilient. It is advantageous to divide the hollow cylinder several times along its longitudinal axis and to hold the resultant segments together by suitable means of graded resilience, for instance, hose springs, rubber rings or the like.

In various stages of development of the rolled roll, the forces which are necessary for the winding differ. This is due, on the one hand, to the fact that the roll is of different cross-sections and on the other hand, due to the fact that in the initial stage a higher force is necessary in order to form the start of the roll. In order not to exert unnecessarily high friction with a correspondingly large amount of wear, if the force required does not need to be particularly great, the factors which affect this force can be made variable over the longitudinal axis of the cylinder. In particular, in accordance with a special feature of the invention, the diametric ratios at the mandrel and hollow cylinder can vary over the length of the rolling path. In the case of hollow cylinders composed of segments, the spring force which holds these segments together can be made different over the length of the cylinder. Both measures can also be employed in common. It is advantageous to allow the hollow cylinder to widen conically.

It is particularly important that the hollow cylinder upon the start of the rolling, properly grasps the edges of the cut piece of fabric to be rolled.

It is proven particularly advantageous for this purpose to round the edge of the hollow cylinder on the side on which it first grasps the roll.

In the production of such rolls, the cross-section of which is relatively large as compared with the diameter, difficulties can arise insofar as the elasticity of the mandrel and possibly of the hollow cylinder is not sufficient to yield sufficiently to the roll without its strength in the rolling direction being thereby reduced. In accordance with another feature of the invention, therefore, an elastic insert of the hollow cylinder (and possibly also the elastic mandrel) can be so developed that the elasticity in a radial direction is increased, but that the strength in axial direction is not impaired thereby. This can be done by known methods in the manner that the elastic layers are provided with inserts which increase their resistance in one direction but leave it unaffected in the other. The simple measure of providing the elastic layer of the hollow cylinder with longitudinal grooves has proven particularly advantageous. Rubber, as is known, is of stable volume. At the points where the rubber is elastically displaced by the roll, it can move into said grooves.

One advantageous device for carrying out the method of the invention will be explained below by way of example with reference to the drawing constituting a part hereof, and in which like reference characters indicate like parts, and in which FIGS. 1 and 2 are longitudinal sections through two alternative embodiments of the invention;

FIG. 3 is a transverse cross-section taken along lines 3—3 of FIG. 2;

FIG. 4 is a view similar to FIG. 3 showing a modified form, and

FIG. 1A is a fragmentary view of the lower part of FIG. 1, showing the mandrel just before the beginning of the rolling action.

In FIG. 1, an elastic rolling mandrel 1 is provided with rod 2 mounted on transverse piece 3 and the guides 4 with a drive device which can impart axial movement to rod 2 and mandrel 1.

Rods 5, on which guides 4 slide can, for example, at the same time hold the frame 6 to which by suitable fastening devices 7, sleeve 8 is fastened over flange 9. The inner diameter of sleeve 8 is larger than the outer diameter of mandrel 1. Sleeve 8, which is a rigid cover bears on the inside an elastic cylindrical covering 10 which consists, for instance, of rubber; in this way, in addition to the elasticity there is also obtained the advantage of a high coefficient of friction on the inner circumference.

The device operates in the following manner:

In rest position, mandrel 1 is at the bottom outside of the hollow cylinder 8, 10. The stocking 12 which is to be worked into a roll 11 is placed in this position around mandrel 1. Thereupon the mandrel is moved into the hollow cylinder. The rounded edge 13 of the elastic insert grasps the upper edge of the stocking 12 which is to be rolled into a roll and allows it to roll up. By the friction on the inner periphery of the hollow cylinder, the roll is further rolled up upon the further advance of the mandrel.

It is contemplated that the mandrel can be made stationary and the hollow cylinder move relatively to it.

The construction of the apparatus shown in FIG. 2 is similar to the construction of the one shown in FIG. 1. In contradistinction to the first embodiment, the hollow cylinder, as can be noted from FIG. 3, is divided into four longitudinal sectors 14, the flange pieces 15 of which are guided loosely in the parts 7; in other words, the sleeve is held loosely in the moving means. Flange pieces 15 are secured to their respective sectors 14. In this way, the hollow cylinder can expand better under the action of the roll. Spaced springs 16 and 17 press sectors 14 inwardly. The tensions of said springs may differ, that is, they may vary. If the spring 16 is made stronger than the spring 17, the force in longitudinal direction from the side of the spring 16 to the side of the spring 17 exerted on the roll upon equal expansion of the hollow cylinder decreases corresponding to the decreasing diametric ratios of the roll. Similar effects can be obtained by making the inside diameter of the hollow cylinder variable and tapered.

In FIG. 3 it is indicated that the hollow cylinder is equipped with longitudinal grooves 18. These longitudinal grooves make possible a relatively easy displaceability of the elastic cylinder in a radial direction, but do not impair its resistance in a longitudinal direction.

In FIG. 4, it is shown that the entire hollow cylinder can be divided into sectors and therefore the slits 20 extend also through the rubber insert. In FIG. 4, the individual sectors 19 are shown in identical construction.

While in the claims reference is made to cylindrical or annular bodies, such bodies are not restricted to those having circular faces, which are surfaces of revolution about a radius.

What is claimed is:

1. A method of producing rolled-up annular bodies which comprises placing a cylindrical body to be rolled on an elastic mandrel, then drawing said mandrel through a hollow sleeve having an elastic face on the inside thereof, said body frictionally engaging said elastic face, whereby said body is rolled up during said drawing.

2. A method according to claim 1 characterized in that said body to be rolled first contacts a rounded edge of said face to initiate said rolling.

3. Apparatus for producing rolled-up annular bodies comprising an elastic mandrel adapted to hold a body to be rolled up, an elastic sleeve in which said mandrel is fitted for longitudinal movement therethrough, the outer face of said mandrel being close to the inner face of said sleeve so that said faces frictionally engage said body, and slidably mounted means for relatively moving said mandrel and sleeve to roll up said body.

4. Apparatus according to claim 3 characterized in that said sleeve has a rounded edge at its inner face adjacent to the point of entrance of said mandrel into said sleeve.

5. Apparatus according to claim 3 characterized in that the outer face of said sleeve has a rigid cover.

6. Apparatus according to claim 3 characterized in that said sleeve is divided longitudinally into sectors.

7. Apparatus according to claim 6 characterized in that at least one spring surrounds said sleeve to press said sectors.

8. Apparatus according to claim 3 characterized in that the inside diameter of said sleeve varies over its length.

9. Apparatus according to claim 3 characterized in that the outside diameter of said mandrel varies over its length.

10. Apparatus according to claim 3 characterized in that at least one face of said sleeve is conical.

11. Apparatus according to claim 7 characterized in that there is a plurality of spaced springs the tensions of which vary.

12. Apparatus according to claim 3 characterized in that the resilience of said sleeve increases in a radial direction, but the resilience in an axial direction is not reduced.

13. Apparatus according to claim 3 characterized in that longitudinal grooves are in the inner face of said sleeve.

14. Apparatus according to claim 3 characterized in that said sleeve is held loosely in said moving means.

References Cited by the Examiner

UNITED STATES PATENTS

| | | | |
|---|---|---|---|
| 2,230,067 | 1/41 | Pedlow | 156—202 |
| 2,944,588 | 7/60 | Sannipoli et al. | 156—294 |

EARL M. BERGERT, *Primary Examiner.*